United States Patent [19]

Im

[11] Patent Number: 5,774,012
[45] Date of Patent: Jun. 30, 1998

[54] CHARGE-PUMPING CIRCUIT FOR SEMICONDUCTOR MEMORY DEVICE

[75] Inventor: Heung-Soo Im, Seoul, Rep. of Korea

[73] Assignee: Samsung Electronics, Co., Ltd., Kyungki-Do, Rep. of Korea

[21] Appl. No.: 713,634

[22] Filed: Sep. 13, 1996

[30] Foreign Application Priority Data

Sep. 14, 1995 [KR] Rep. of Korea .................. 30105/1995

[51] Int. Cl.⁶ ...................................................... G05F 1/10
[52] U.S. Cl. ............................ 327/536; 327/537; 327/589
[58] Field of Search .................................. 327/536, 537, 327/538, 589

[56] References Cited

U.S. PATENT DOCUMENTS

| 5,140,182 | 8/1992 | Ichimura | 327/536 |
| 5,180,928 | 1/1993 | Choi | 327/536 |
| 5,386,151 | 1/1995 | Folmsbee | 327/536 |
| 5,394,372 | 2/1995 | Tanaka et al. | 327/536 |
| 5,561,385 | 10/1996 | Choi | 327/536 |
| 5,589,793 | 12/1996 | Kassapian | 327/536 |

Primary Examiner—Timothy P. Callahan
Assistant Examiner—Jung Ho Kim
Attorney, Agent, or Firm—Marger, Johnson, McCollom & Stolowitz, PC

[57] ABSTRACT

A charge-pumping circuit of a semiconductor memory device for generating a voltage higher than an applied supply voltage, including a first MOS transistor having gate and drain terminals through which the supply voltage is received and a source terminal through which an initial voltage is provided to a first node; a first capacitor with predetermined capacitance having one plate connected to the first node and the other plate through which an applied first oscillating signal is received; a third MOS transistor having gate and source terminals connected to the first node to introduce the electric current of the first node into its drain terminal; a second capacitor with capacitance lower than that of the first capacitor, having one plate connected to the second node that is the drain terminal of the third MOS transistor and the other plate through which an applied second oscillating signal is received; and a second MOS transistor having drain and gate terminals connected to the first node and the second node each and a source terminal connected to an output terminal so as to apply the voltage of the first node to the output terminal in response to the voltage of the second node.

9 Claims, 2 Drawing Sheets

FIG. 4A (osc)

FIG. 4B (osc')

CHARGE-PUMPING CIRCUIT FOR SEMICONDUCTOR MEMORY DEVICE

BACKGROUND OF THE INVENTION

1. Field of the Invention

The present invention relates to a charge-pumping circuit for a semiconductor memory device, and more particularly to a circuit that can perform an improved charge-pumping operation.

The present application is based on Korean Patent Application No. 30105/1995 which is incorporated herein by reference for all purposes.

2. Description of the Related Art

Rapid and remarkable progress has been made in electronics, especially in semiconductor device technologies, in which smaller and lighter weight electronic appliances have been developed. As the size of the electronic appliances is reduced, it is particularly important to develop a semiconductor memory device which operates at a low-level voltage with a single power supply. Some kinds of semiconductor memory devices, however, employ a circuit that requires a voltage which may be higher than an internal supply voltage to the device, or, alternately, has improved operational characteristics at higher voltages. Hence, it would be advantageous to include a circuit that, when coupled to a semiconductor memory device, can increase the circuit voltage to a level which is higher than the single supply voltage applied to the device. Additionally, it would be advantageous to include a charge pumping circuit that can increase a supply voltage applied thereto, as by using the coupling effect and charge sharing by capacitors.

FIG. 1 shows a conventional charge-pumping circuit which was first proposed in John F. Dickson, "On-chip high-voltage generation in NMOS Integrated Circuits Using an Improved Voltage Multiplier Technique", *IEEE J. Solid-State Circuit*, Vol. SC-11, 1976, pp 374–378. The Dickson charge-pumping circuit includes a plurality of transistors and capacitors: $MN_1$, $MN_2$, $MN_3$, $MN_4$, $MN_5$, ..., $MN_{n+}$, $MN_{n+1}$ which denote NMOS (metal oxide semiconductor) transistors; and $C_1$, $C_2$, $C_3$, $C_4$, ..., $C_{n-1}$, $C_n$ which denote capacitors.

Each electrode (or one-side plate) of the capacitors C1 and C2 is provided with oscillating signals OSC and $\overline{OSC}$, as shown in FIGS. 2A and 2B. The oscillating signal OSC is a clock signal with a predetermined period that is produced from an oscillator, where the $\overline{OSC}$ signal shown in FIG. 2B is an inversion of the FIG. 2A OSC signal.

A first transistor $MN_1$, of FIG. 1 has its gate and one source/drain connected to a supply voltage $V_{cc}$ and the other source/drain connected to node $N_1$, to serve to set an initial voltage of the node $N_1$ to a predetermined level. This initial voltage corresponds to a difference between the supply voltage $V_{cc}$ and a threshold voltage $V_{th}$ of the first transistor. The first transistor $MN_1$ has its gate and source/drain connected in common, and also serves as a diode that prevents the electric current from flowing backward to the supply voltage $V_{cc}$ from the node $N_1$.

A second transistor $MN_2$ has gate and one source/drain connected to the node $N_1$ and the other source/drain connected to node $N_2$. The second transistor $MN_2$ serves to send the electric current from the node $N_1$ to the node $N_2$ when the voltage of the node $N_1$ is larger than that of the node $N_2$ and to prevent the electric current from flowing backward into the node $N_1$ from the node $N_2$ when the voltage of the node $N_2$ is larger than that of the node $N_1$.

A third transistor $MN_3$ is connected between the node $N_2$ and node $N_3$, and serves to transfer the current from the node $N_2$ to the node $N_3$. The transistors $MN_4$, $MN_5$, ..., $MN_n$, $MN_{n+1}$, are coupled in series in the same manner as that of the transistor $MN_3$, and serve to only transfer the current to the next node in one direction. The first capacitor $C_1$ has one electrode connected to the node $N_1$ and the other electrode connected to a terminal of the oscillating signal OSC. The first capacitor $C_1$ is designed to have a capacitance that is sufficiently greater than any other capacitances existing at the node $N_1$. The capacitor $C_2$ has one electrode connected to the node $N_2$ and the other electrode connected to a terminal of the signal $\overline{OSC}$. The second capacitor $C_2$ is designed to have a capacitance that is sufficiently greater than any other capacitances existing at the node $N_2$. Even numbered capacitors $C_2$, $C_4$ (not shown), ..., and $C_n$ are connected between the respective transistors in the same manner as that of the capacitor $C_2$. Odd numbered capacitors $C_3$, $C_5$, ..., and $C_{n-1}$ are connected between the respective transistors in the same manner as that of the capacitor $C_1$.

When a supply voltage $V_{cc}$ is applied to the charge-pumping circuit of FIG. 1, the initial voltage of the node $N_1$ is set to an initial voltage level determined by the difference between the supply voltage, $V_{cc}$, and the threshold voltage, $V_{th}$, when the first transistor MN, is turned on. Node $N_2$'s initial voltage is set to a level determined by the difference between the supply voltage and twice the transistor threshold voltage (or otherwise by adding the threshold voltage of the transistor $MN_1$ to that of the transistor $MN_2$). When the level of the oscillating signal OSC is varied from a ground voltage to a level of the supply voltage, the capacitance of the first capacitor $C_1$ is greater than that of the node $N_1$, and almost the whole variations in voltage of the signal OSC is transferred to the node $N_1$ by the coupling effect. Accordingly, the voltage of the node $N_1$ corresponds to the difference between twice the supply voltage and the threshold voltage ($2V_{cc}-V_{th}$), and has the level of voltage increased by the supply voltage from the level of the initial voltage. Since the transistor $MN_2$ is being turned on, charging sharing occurs between the node $N_1$ and the node $N_2$. Consequently, the voltage of the node $N_2$ has a level of voltage increased by $\Delta V$ from the initial voltage, where $V_{N2}=V_{cc}-2V_{th}+\Delta V$.

At this point, when the level of the signal OSC oscillates to the level of the supply voltage from that of the ground voltage and the level of the signal $\overline{OSC}$ oscillates to a level of the supply voltage from that of the ground voltage, the voltage of the node $N_2$ corresponds to a difference between twice the supply voltage and twice the threshold voltage plus $\Delta V$, or $V_{n2}=2V_{cc}-2V_{th}+\Delta V$.

In the circuit of FIG. 1, a voltage having a desired level according to the number of the transistors and capacitors is generated as output voltage through $V_p$. Such a charge-pumping circuit of FIG. 1 employs a plurality of NMOS transistors for one-way transfer of the electric current pumped thereby. However, the output voltage level pumped by this circuit and its current supply capability is limited by the threshold voltages of its NMOS transistors. In order to reduce such a limit, native NMOS transistors with relatively low threshold voltage and low body effect should be used; otherwise the operational efficiency of the charge-pumping circuit may be significantly lowered. Fabricating native NMOS transistors, however, is expensive and increases the overall production costs for the circuit.

Accordingly, the need exists for a charge-pumping circuit usable in cooperation with a semiconductor device which advances over the prior art, particularly in providing efficient charge-pumping without the associated increase in fabrication costs.

SUMMARY OF THE INVENTION

It is therefore a first object of the present invention to provide a charge-pumping circuit for a semiconductor memory device and a high-voltage generating method to solve the disadvantages and problems of a conventional circuit and method.

It is a second object of the present invention to provide an improved charge-pumping circuit for a semiconductor memory device that can generate a voltage higher than an applied supply voltage without the use of native NMOS transistors.

It is a third object of the present invention to provide an improved charge-pumping circuit for a semiconductor memory device that may ensure the operational efficiency similar to or greater than that of a circuit employing the native NMOS transistors.

It is a fourth object of the present invention to provide an improved charge-pumping circuit for a semiconductor memory device that does not require native NMOS transistors, thereby reducing overall production costs.

In order to realize the above objects, the present invention discloses a charge-pumping circuit of a semiconductor memory device for generating a voltage higher than an applied supply voltage. The inventive circuit includes a first MOS transistor having gate and drain terminals through which the supply voltage is received and a source terminal through which an initial voltage is provided to a first node; a first capacitor with predetermined capacitance having one plate connected to the first node and the other plate through which an applied first oscillating signal is received; a third MOS transistor having gate and source terminals connected to the first node to introduce the electric current of the first node into its drain terminal; a second capacitor with capacitance lower than that of the first capacitor, having one plate connected to the second node that is the drain terminal of the third MOS transistor and the other plate through which an applied second oscillating signal is received; and a second MOS transistor having drain and gate terminals connected to the first node and the second node respectively and a source terminal connected to an output terminal so as to apply the voltage of the first node to the output terminal in response to the voltage of the second node.

The first, second and third transistors are each normal NMOS transistors in order to transfer the charge supplied by the charge-pumping operation in only one direction. It has been determined that the the above described inventive charge-pumping circuit can operate using normal NMOS transistors at an efficiency similar to or greater than that of a circuit employing native NMOS transistors. When the normal NMOS transistor threshold voltages and body effects are large as compared to native NMOS transistors, one of the capacitors is designed to have a capacitance that is relatively higher than that of the other capacitor in order to secure sufficient operational efficiency. For convenience sake, the first capacitor and the second capacitor are referred to as a main one and sub-one, respectively in the specification.

The charge supplied by the main capacitor is used to increase voltage and to set an initial voltage of the sub-capacitor. On the basis of the initial voltage increased by the main capacitor, the sub-capacitor increases the gate voltage of the transistor that serves to pass the charge supplied by the charge-pumping circuit to the load. The gate voltage increased herein is higher than the voltage increased by the main capacitor. In accordance with the present invention, the voltage generated by the main capacitor can be transferred to the load connected to the output terminal without any loss from the threshold voltages of the MOS transistors used to one-way transfer the charge to the load.

BRIEF DESCRIPTION OF THE DRAWINGS

A preferred embodiment of the present invention will be described in detail with reference to the accompanying drawings.

FIGS. 4A and 4B are waveforms of signals provided to the circuit of FIG. 3.

DETAILED DESCRIPTION OF THE PREFERRED EMBODIMENT

Figure 1:
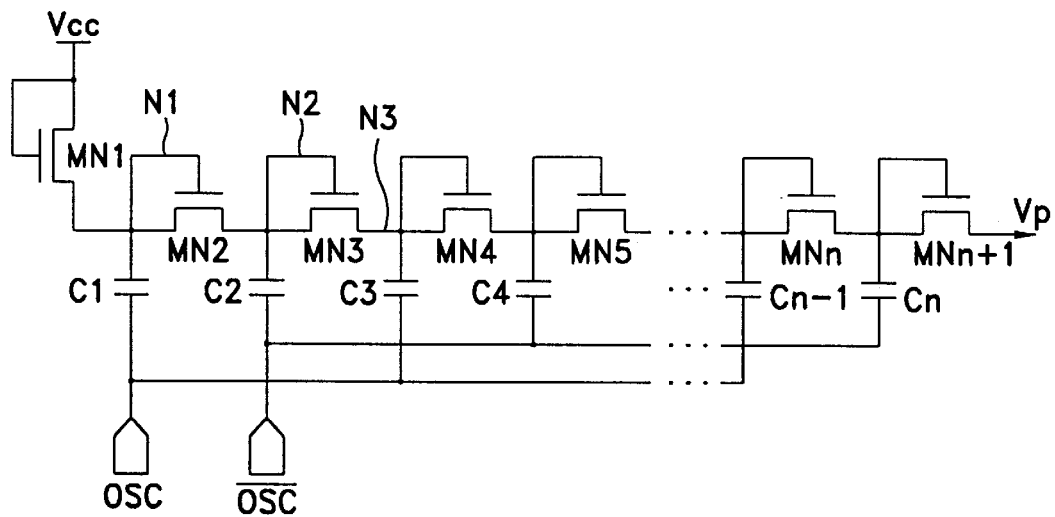
FIG. 1 depicts a conventional charge-pumping circuit.
Figure 2A:
FIGS. 2A and 2B are waveforms of signals provided to the circuit of FIG. 1.
Figure 2B:
Figure 3:
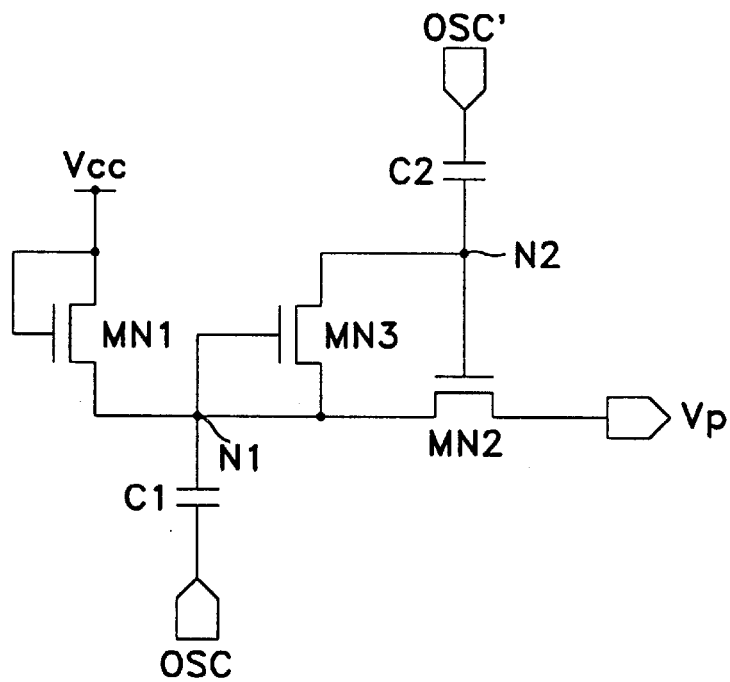
FIG. 3 depicts a circuit diagram of a charge-pumping circuit in accordance with the present invention.

Referring to FIG. 3, a first MOS transistor $MN_1$ has a control electrode, or gate, and one of the source/drain terminals connected in common to a supply voltage $V_{cc}$ and the other source/drain terminal through which an initial voltage is applied to a first node $N_1$. A first or main capacitor $C_1$ with a predetermined capacitance has one plate connected to the node $N_1$ and another plate to which a first oscillating signal OSC is applied. A third MOS transistor $MN_3$ has gate and one of the source/drain terminals connected in common to the first node $N_1$ and the one plate of capacitor $C_1$ and receives the electric current of the first node $N_1$ through its drain/source terminal. A second capacitor (sub-capacitor) $C_2$ with a capacitance lower than that of the first capacitor has one plate connected to a second node $N_2$, which is the drain/source terminal of the third MOS transistor $MN_3$, and another plate to which a second oscillating signal OSC' is applied. A second MOS transistor $MN_2$ has a drain terminal connected to the first node $N_1$, a gate terminal connected to the second node $N_2$, and a source terminal connected to output terminal $V_p$ to provide the voltage of the first node to the output terminal $V_p$ in response to the voltage of the second node $N_2$.

The first, second and third transistors $MN_1$, $MN_2$ and $MN_3$ are each normal NMOS transistors, and the first and second capacitors $C_1$ and $C_2$ are normal MOS capacitors that in a preferred embodiment have capacitances different from each other's.

The first oscillating signal OSC is a clock signal emitted periodically by an oscillator formed inside of a semiconductor memory device, and has a waveform as shown in FIG. 4A.

In the preferred emboidment, the second oscillating signal OSC' as shown in FIG. 4B has the same period as that of the first signal OSC and a pulse width smaller than that of the signal OSC. The output terminal $V_p$ of FIG. 3 is provided with output voltage of the charge-pumping circuit.

As shown in FIG. 3, the first transistor $MN_1$ has its gate and source/drain terminals connected in common to a supply voltage $V_{cc}$ and the other source/drain terminal connected to a first node $N_1$. When the initial voltage of the node $N_1$ is set to a difference between the supply voltage and threshold voltage and the voltage of the first node $N_1$ is higher than the supply voltage, the first transistor $MN_1$ serves to prevent the electric current from flowing backward to the supply voltage $V_{cc}$ from the node $N_1$.

The second transistor $MN_2$ has one source/drain terminal connected to the node $N_1$, the other source/drain terminal connected to the output terminal $V_p$, and gate terminal connected to the node $N_2$. When the voltage of the node $N_1$ is higher than the voltage of the output terminal $V_p$, the second transistor $MN_2$ introduces the electric current of the node $N_1$ to the output terminal $V_p$. The third transistor $MN_3$ has the gate and source/drain terminals connected in common to the node $N_1$ and the other source/drain terminal connected to the node $N_2$. When the voltage of the node $N_2$ is higher than the voltage of the node $N_1$, the third transistor $MN_3$ serves to prevent the electric current from flowing backward to the node $N_1$ from the node $N_2$. The first and third transistors $MN_1$ and $MN_3$ serve as diodes, and can be made as a diode having the same characteristics if circumstances require.

The first capacitor $C_1$ has one plate connected to the node $N_1$ and the other plate connected to the terminal of the first oscillating signal OSC. The capacitor $C_1$ is designed to have capacitance sufficiently higher than any other capacitances existing at the node $N_1$. The second capacitor $C_2$ has one plate connected to the node $N_2$ and the other plate connected to the terminal of the second oscillating signal OSC'. The capacitor $C_2$ is designed to have capacitance sufficiently higher than any other capacitances existing at the node $N_2$, and the capacitance is preferably less than one-half the capacitance of the capacitor $C_1$.

The charge-pumping circuit of the present invention can be connected in series or in parallel with a like circuit to further boost a voltage. For example, if a single charge-pumping circuit has a pumping capability of 3V, two additional circuits of the construction of FIG. 3 can be connected in series to the terminal $V_p$ of the first such circuit to increase the output pumping voltage to 9V. In order to increase the magnitude of current, leaving the level of the voltage as it is, more than one of such charge-pumping circuit can be connected in parallel with the first such charge-pumping circuit where the output voltage is obtained through a common output terminal.

The following describes the operation of the charge pumping circuit of FIG. 3. When a supply voltage $V_{cc}$ is applied to the charge pumping circuit, an initial voltage of the node $N_1$ is a difference between the supply voltage and the first transistor's threshold voltage. An initial voltage of the node $N_2$ is a difference between the supply voltage and twice the threshold voltage of the first transistor. When the level of the first oscillating signal OSC is changed to the level of the supply voltage from that of the ground voltage, the capacitance of the first capacitor $C_1$ is greater than that of the node $N_1$ and the voltage of the node $N_1$ is increased further by variations in voltage of the signal OSC according to the coupling effect of the capacitor $C_1$. The voltage of the node $N_1$ has a level of variations between the supply voltage and the initial voltage, and is represented as a difference between twice the supply voltage and the threshold voltage. Accordingly, the voltage of the node $N_2$ is represented as a difference between twice the supply voltage and twice the threshold voltage by the transistor $MN_3$. At this point, the oscillating signals OSC' and OSC are applied to the capacitor $C_2$ at a predetermined interval. When the voltage of the oscillating signal OSC' is changed from the ground voltage to the supply voltage, almost the whole signal OSC's variations in voltage are transferred to the node $N_2$ by the coupling effect of the second capacitor $C_2$, and the voltage of the node $N_2$ corresponds to a difference between three times the supply voltage and twice the threshold voltage.

The following table illustrates these voltage levels:

TABLE 1

|  | $N_1$ | $N_2$ | $|N_1-N_2|$ |
|---|---|---|---|
| Initial | $V_{cc}-V_{th}$ | $V_{cc}-2V_{th}$ | $|V_{th}|$ |
| OSC = $V_{cc}$ | $2V_{cc}-V_{th}$ | $2V_{cc}-2V_{th}$ | $|V_{th}|$ |
| OSC' = $V_{cc}$ | $2V_{cc}-V_{th}$ | $3V_{cc}-2V_{th}$ | $|V_{cc}-V_{th}|$ |

In conclusion, when the voltage of the node $N_1$ is applied to the output terminal $V_p$ via the transistor $MN_2$, and, in other words, when the voltage of the node $N_1$ serving as the drain terminal of the transistor $MN_2$ is a difference between twice the supply voltage and the threshold voltage, the voltage of the node $N_2$ connected with the gate terminal of the second transistor $MN_2$ corresponds to a difference between three times the supply voltage and twice the threshold voltage. Hence, there occurs a voltage difference equivalent to the difference between the supply voltage and the threshold voltage in the gate and drain terminals of the second transistor $MN_2$. The voltage of the node $N_1$ may be completely transferred to the output terminal $V_p$ without any voltage loss by the transistor $MN_2$.

Without the use of native NMOS transistors, the inventive charge-pumping circuit may ensure the operational efficiency similar to or greater than that of a circuit employing the native NMOS transistors. Additionally, the manufacturing process of the inventive charge-pumping circuit does not need the step of fabricating native NMOS transistors, which results in lowering overall production costs.

It should be understood that the present invention is not limited to the particular embodiment disclosed herein as the best mode contemplated for carrying out the present invention, but rather that the present invention is not limited to the specific embodiments described in this specification except as defined in the appended claims. For example, the construction of source/drain terminals, basic components of transistors may be changed, and transistors can be replaced with the diodes. Moreover, the pumping capability of the charge-pumping circuit can be greater than that of the preferred embodiment by series connection of such a unit charge-pumping circuit or load capacity enhanced by parallel connection thereof. The present invention is applied particularly to semiconductor memory devices such as a dynamic random access memory, a static random access memory, an erasable and programmable read only memory, and may be applicable to other electronic appliances and electronic fields through various modifications.

I claim:

1. A circuit for generating a voltage at an output terminal that is higher than an applied supply voltage, comprising:
    a voltage switching transistor having a conductive path which is interposed between an output terminal and a first capacitive node and having a control electrode;
    a first oscillating signal source for providing a first oscillating signal;
    a first capacitor coupled in series between the first capacitive node and the first oscillating signal source;
    a second oscillating signal source for providing a second oscillating signal having the same period as the first oscillating signal source and having a pulse width less than that of the first oscillating signal source;
    a second capacitor coupled in series between the second oscillating signal source and the control electrode of the switching transistor, wherein said second capacitor has a capacitance which is less than a capacitance of said first capacitor;

input means for receiving a supply voltage and coupled to the first capacitive node for establishing an initial voltage at said first capacitive node while preventing charge from flowing backward from the said node to the power supply; and means coupled to the first capacitive node for establishing an initial voltage at the second capacitor while preventing charge from flowing backward from the second capacitor toward the first capacitive node.

2. A circuit for generating a voltage higher than a supply voltage, comprising:

a first transistor connected between the supply voltage and a first node, said first transistor having a control electrode coupled to the supply voltage;

a second transistor connected between the first node and an output terminal, said second transistor having a control electrode coupled to a second node;

a first capacitor interposed between a first oscillating signal and the first node;

a third transistor connected between the first node and the second node, said third transistor having a control electrode coupled to the first node; and a second capacitor interposed between a second oscillating signal and the second node, wherein said second capacitor has a capacitance which is less than a capacitance of said first capacitor.

3. The circuit of claim 2 wherein said second capacitor has a capacitance which is less than one-half of a capacitance of said first capacitor.

4. The circuit of claim 2 wherein said first, second, and third transistors are normal NMOS transistors.

5. The circuit of claim 2, further including:

a first oscillating signal source capable of generating an first oscillating signal having a predefined period and pulse width; and a second oscillating signal source capable of generating a second oscillating signal having a period equal to the predefined period of the first oscillating signal and a pulse width smaller than the first oscillating signal pulse width.

6. The circuit of claim 2 further including a like circuit connected in parallel.

7. The circuit of claim 2 further including:

a fourth transistor connected between the output terminal and a third node, said fourth transistor having a control electrode coupled to the output terminal;

a fifth transistor connected between the third node and a second output terminal, said fifth transistor having a control electrode coupled to a fourth node;

a third capacitor interposed between the first oscillating signal and the third node;

a sixth transistor connected between the third node and the fourth node, a control electrode of said sixth transistor being coupled to the third node; and a fourth capacitor interposed between the second oscillating signal and the fourth node.

8. A method for providing an increased voltage to an output terminal from a supply voltage comprising:

connecting a first transistor between the supply voltage and a first node;

coupling a control electrode of said first transistor to the supply voltage;

connecting a second transistor between the first node and the output terminal;

coupling a control electrode of said second transistor to a second node;

interposing a first capacitor between a first oscillating signal and the first node;

connecting a third transistor between the first node and the second node;

coupling a control electrode of said third transistor to the first node;

interposing a second capacitor between a second oscillating signal and the second node, wherein said second capacitor has a capacitance which is less than a capacitance of said first capacitor.

9. The method of claim 8, further including:

oscillating said first oscillating signal with a predetemined period and pulse width; and oscillating said second oscillating signal with a period equal to and a pulse width less than said first oscillating signal.

* * * * *